United States Patent
Ikonen et al.

(10) Patent No.: US 6,804,357 B1
(45) Date of Patent: Oct. 12, 2004

(54) METHOD AND SYSTEM FOR PROVIDING SECURE SUBSCRIBER CONTENT DATA

(75) Inventors: Ari M. Ikonen, Raisio (FI); Harri Okkonen, Mountain View, CA (US); Pekka J. Heinonen, Espoo (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/559,061

(22) Filed: Apr. 28, 2000

(51) Int. Cl.[7] .................. G06K 19/06; H04M 11/00
(52) U.S. Cl. .................. 380/241; 380/228; 713/182; 713/185; 725/30; 725/31; 348/14.01; 348/14.04; 348/14.05; 379/110.01
(58) Field of Search .................. 380/241, 228; 725/30, 31; 713/182, 185; 348/14.01, 14.04, 14.05; 379/110.01

(56) References Cited

U.S. PATENT DOCUMENTS

| | | |
|---|---|---|
| 4,736,422 A | 4/1988 | Mason |
| 4,802,215 A | 1/1989 | Mason |
| 4,864,615 A | 9/1989 | Bennett et al. |
| 5,570,415 A * | 10/1996 | Stretton et al. ........ 379/110.01 |
| 5,814,798 A * | 9/1998 | Zancho ................... 235/380 |
| 6,035,397 A * | 3/2000 | Campinos et al. ........... 380/28 |
| 6,409,089 B1 * | 6/2002 | Eskicioglu ................. 235/492 |
| 6,411,725 B1 * | 6/2002 | Rhoads ..................... 382/100 |
| 6,424,947 B1 | 7/2002 | Tsuria et al. |

FOREIGN PATENT DOCUMENTS

| | | | |
|---|---|---|---|
| DE | 42 12 200 A1 | 2/1993 | |
| DE | 196 25 689 A1 | 1/1998 | |
| EP | 0776132 | 5/1997 | .......... H04N/7/173 |
| GB | 2 241 096 A | 8/1991 | |
| GB | 2 334 125 A | 8/1999 | |
| JP | EP 0 8056348 | 2/1996 | |
| WO | WO 95/17796 | 6/1995 | |

* cited by examiner

*Primary Examiner*—Ayaz Sheikh
*Assistant Examiner*—Taghi T. Arani
(74) *Attorney, Agent, or Firm*—Antonelli, Terry, Stout & Kraus, LLP

(57) ABSTRACT

A personalized smart card stores therein public and private cryptography keys stored which are used to securely request and receive subscriber content data from a service provider, utilizing a remote control device.

60 Claims, 3 Drawing Sheets

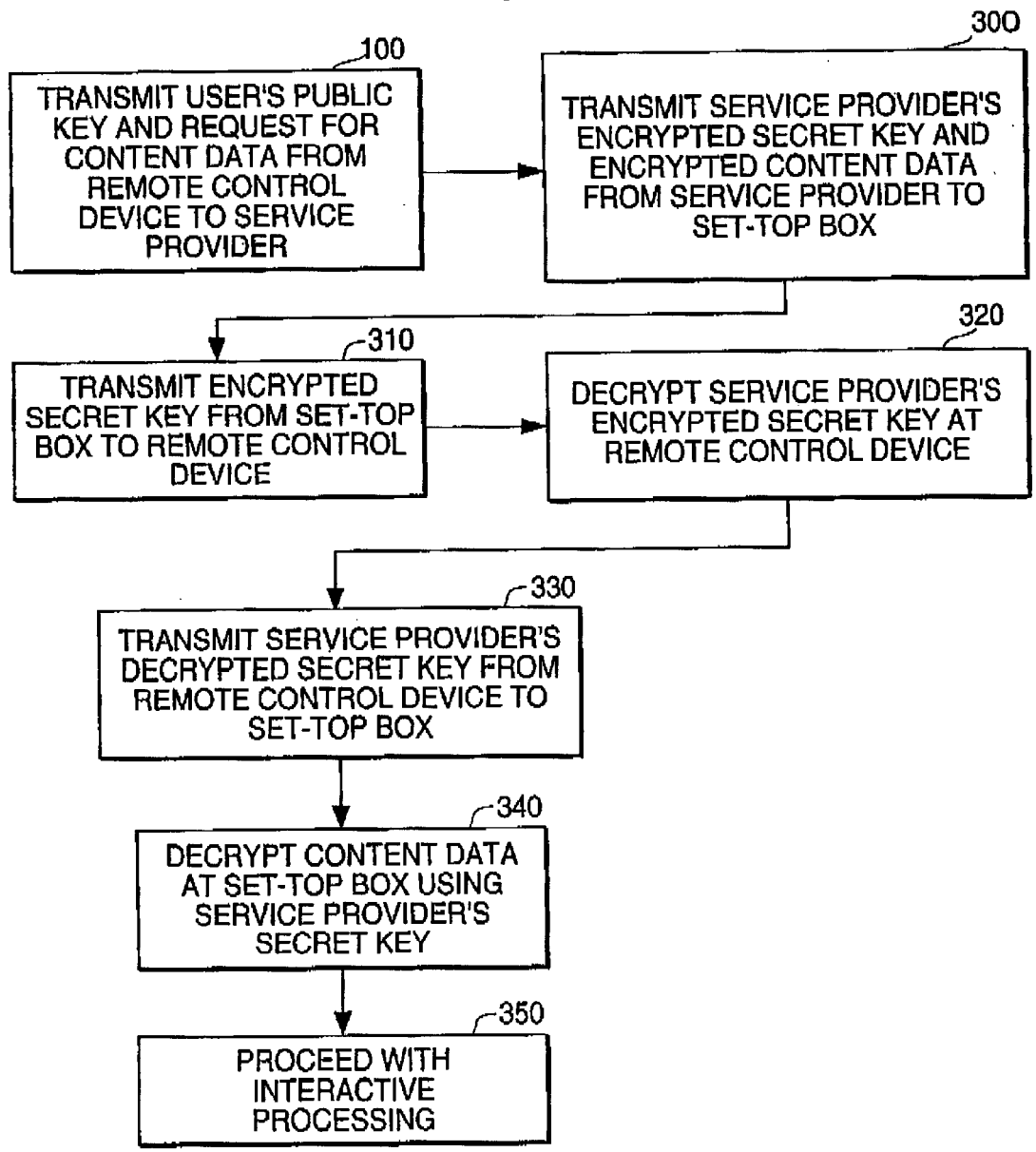

METHOD AND SYSTEM FOR PROVIDING SECURE SUBSCRIBER CONTENT DATA

FIELD OF THE INVENTION

The present invention relates to a system and method for providing a user with subscriber content data utilizing a remote control device which interacts with a service provider and set-top box over respective transmission paths. More specifically, the remote control device is smart card activated and enabled to provide a high level of security for the transmission of requests for subscriber content data and the transmission of the requested subscriber content data.

DESCRIPTION OF THE PRIOR ART

As advances are made in communications, especially wireless communications, and as efforts have been made to provide even more convenience for consumers, personal service providers have entered the homes and offices of their customers by providing their services by computer, television and other such multimedia terminals.

Examples of such services offered in the home include, but are certainly not limited to, personal banking, shopping and entertainment, which further includes pay-per-view programming and interactive video games.

To that end, European Patent Application EP 0 776 132 A2 describes an interactive television system in which service providers are able to provide services such as entertainment programs to users and also conduct electronic user polls, by utilizing terminals which communicate bidirectionally with a central computer. Each user of a terminal in the system is able to request services or even participate in polling by using a remote control apparatus. Furthermore, each remote control apparatus is registered to the respective user thereof, so that any message data issued by the respective remote control apparatus is accompanied by identifier information read out from a memory thereof for identifying the particular transmitting remote control apparatus. Individual user recognition by the remote control device can also be implemented using a plug-in IC card interface or fingerprint recognition section.

More particularly, the remote control apparatus has a personal information storage section, with a remote control apparatus identifier stored therein to identify that specific remote control apparatus. Thus, before sending any messages data from a user's assigned remote control apparatus, the user must first input a password in order to use the remote control apparatus.

Further, the remote control apparatus may include an encryption processing section by which the user's personal information can first be encrypted, and the encrypted code is then transmitted in place of the user's personal information in the transmitted data message.

Further still, in an effort to prohibit unauthorized users from using the specifically assigned remote control apparatus, the remote control apparatus may also include an interface section, or receptacle, for a plug-in IC (integrated circuit) card which enables the IC to be electrically connected via a data input port to a CPU (central processing unit). Thus, a user of the remote control apparatus must first insert the appropriate IC into the interface section, so that the CPU can execute processing to compare identification data stored on the IC with the user-specifying code stored in the remote control apparatus, to thereby effect recognition of the authorized user.

According to such embodiments, in order to request services through an interactive television system, a user thereof must therefore use a specifically assigned remote control apparatus which has user personal information stored therein in order to conduct interactive processing using a remote control apparatus.

Thus, existing security features of the interactive television system utilizing remote control apparatuses intended to prohibit non-designated users from using the specifically assigned remote control apparatus include (1) having a user enter a password to the remote control apparatus in order to activate the remote control apparatus, (2) attaching encrypted user-identification information to data messages transmitted from the remote control apparatus, and (3) comparing user identification information stored in the remote control apparatus with user identification information stored in a CPU by mounting an IC on the remote control apparatus which is connected to the CPU in order to perform the user identification information comparison.

However, the prior art is unable to ensure security of interactive transactions, including data requests and data transmissions between the user of a remote control apparatus and a service provider.

SUMMARY OF THE INVENTION

Therefore, it is an object of the present invention to provide an interactive multimedia personal service system in which a user utilizes a smart-card activated and enabled remote control device to interact with a service provider, via a set-top box, utilizing respective transmission paths, to securely request and receive subscriber content data.

The present invention relates to an interactive subscriber content data system which provides secure interaction between a user's remote control device, a set-top box and a service provider. An end user of the system holds a remote control device which may be a system-specific remote control device or a personal hand-held device, a hand-held pager or a wireless telephone.

The remote control device provides secure transmissions for requests of subscriber content data since the remote control device is activated by the insertion of a user's personalized smart card into a reader which has contacts which contact corresponding contacts on a surface of the smart card. The smart card includes a security chip which includes personalized identification information for activating the remote control device, and further includes both a public key and a private key for encryption and decryption purposes, respectively.

After the user has activated the remote control device by inserting his or her personalized smart card into the reader, the user enters a request for subscriber content data using a key-pad or a smart touch pad on the remote control device. The request for subscriber content data as well as the user's public key, which is stored on the user's smart card, are then transmitted to the service provider over a first transmission path which is a two-way transmission path which includes a short message service (SMS).

In response to the request for subscriber content data from the user's remote control device, the following embodiments are provided, although the invention is not at all limited thereto.

In a first response embodiment, the service provider receives the user's transmitted public key, encrypts a secret key corresponding to the service provider, and transmits the encrypted secret key corresponding to the service provider back to the remote control device, via the same two-way connection between the remote control device and the service provider on which the request for the subscriber content data was originally transmitted.

Upon receiving the encrypted secret key which has been encrypted using the user's public key from the service provider, the remote control device decrypts the service provider's secret key using the user's private key which is stored on the user's smart card. The remote control device then transmits the decrypted secret key corresponding to the service provider to a set-top box over a second transmission path which is a two-way connection between the remote control device and the set-top box. The two-way transmission path between the remote control device and the set-top box includes encrypted transmission connections such as a bluetooth connection.

The set-top box is a multi-media terminal which receives the requested subscriber content data from the service provider over a third transmission path. The third transmission path is a one-way broadcasting path from the service provider to the set-top box including a digital video broadcasting transmission (DVB-T). The requested content data is decrypted at the set-top box after the set-top box has received both the subscriber content data which has been encrypted by the service provider's secret key over the third transmission path and the decrypted secret key corresponding to the service provider from the remote control device over the second transmission path. Then the encrypted requested subscriber content data is decrypted and is then ready for display and/or further interactive activity ordered by the user of the remote control device.

In a second embodiment, after the request for subscriber content data and the user's public key have been transmitted from the user's remote control device to the service provider over the first transmission path, the service provider encrypts the secret key corresponding to the service provider using the user's transmitted public key and also encrypts the requested subscriber content data using the secret key. Then, the service provider transmits to the set-top box both the encrypted secret key corresponding to the service provider which has been encrypted using the user's public key and the requested subscriber content data which has been encrypted using the service provider's secret key. The transmission from the service provider to the set-top box is made over the third transmission path, which is the one-way transmission path from the service provider to the set-top box.

The set-top box then transmits the encrypted secret key to the remote control device over the second transmission path which includes the two-way encrypted connection between the set-top box and the remote control device. Upon receiving the encrypted secret key, the remote control device decrypts the service provider's secret key using the user's private key which is stored on the user's smart card. The remote control device then transmits the decrypted secret key corresponding to the service provider back to the set-top box over the second transmission path, thus enabling the encrypted subscriber content data to be decrypted at the set-top box using the service provider's secret key. The decrypted subscriber content data is then ready for display and/or further interactive activity ordered by the user of the remote control device.

It is noted that the transmission paths described above connecting the remote control device and the service provider, the remote control device and the set-top box, and the service provider and the set-top box, respectively, are the same for both embodiments described above.

BRIEF DESCRIPTION OF THE DRAWINGS

The scope of the present invention will be apparent from the following detailed description, when taken in conjunction with the accompanying drawings, and such detailed description, while indicating preferred embodiments of the invention, are given as illustrations only, since various changes and modifications within the spirit and scope of the invention will become apparent to those skilled in the art from this detailed description, in which:

FIG. 3 shows a flowchart of the processing according to a second method embodiment of the present invention.

DETAILED DESCRIPTION OF THE PREFERRED EMBODIMENTS

Figure 1:
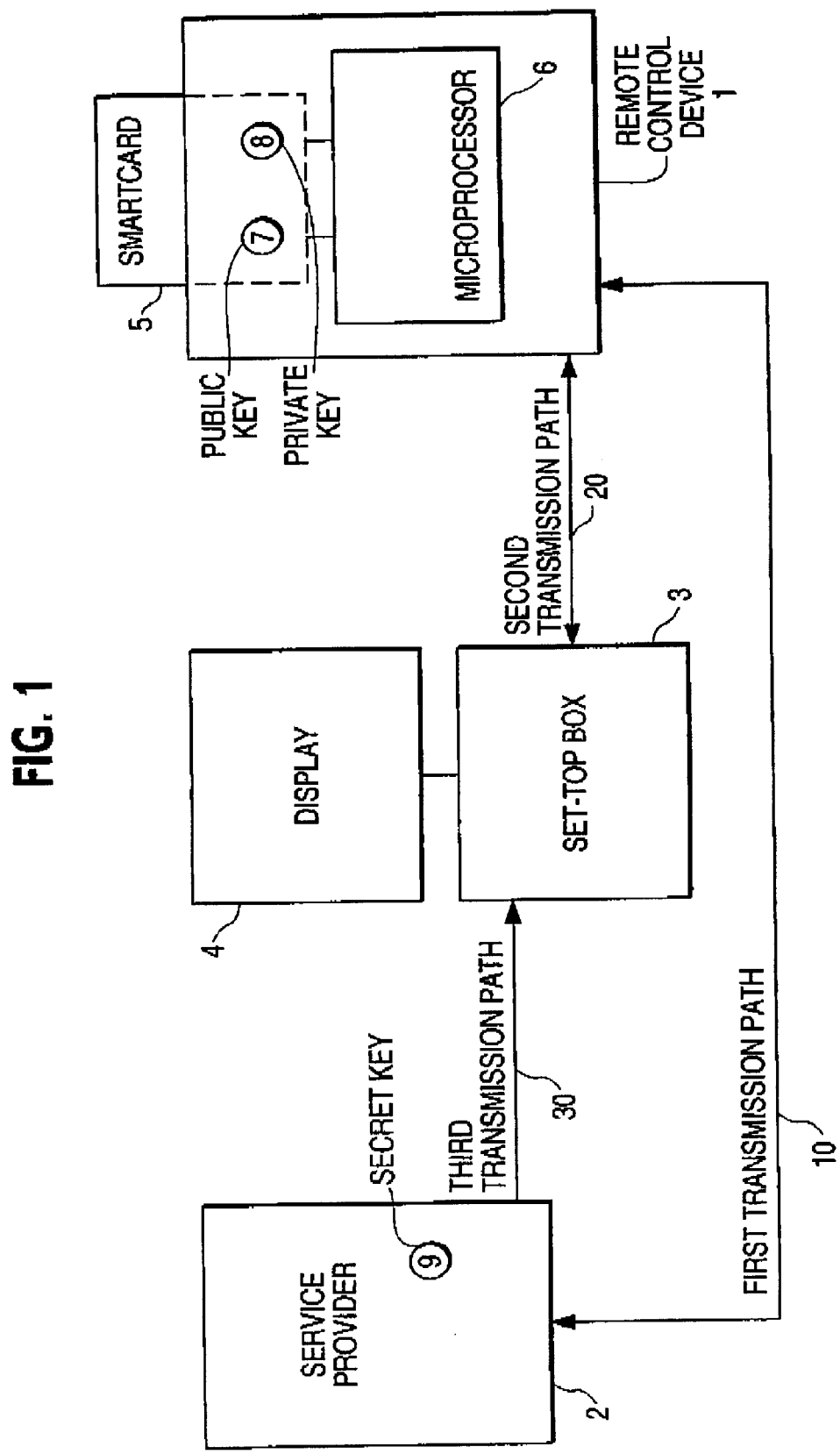
FIG. 1 shows a box-chart corresponding to a system embodiment of the present invention.

In the detailed description of the subject invention which follows, when appropriate, like reference numerals and characters may be used to designate identical, corresponding or similar components in different figure drawings. Furthermore, example sizes/models/values/ranges may be given, although the present invention is not intended to be so limited.

According to an example embodiment of the present invention, an interactive subscriber content data system provides secure interaction between a user's remote control device, a set-top box and a service provider. As shown in FIG. 1, for example, an end user of the system holds a remote control device 1 which may be a system-specific remote control device or a personal hand-held device including, but not limited to, a hand-held pager or a wireless telephone.

The remote control device 1 provides secure transmissions for requests of subscriber content data since the remote control device 1 is activated by the insertion of a user's personalized smart card 5 into the remote control device 1 where it is read. The smart card 5 includes a security chip which includes personalized identification information for activating the remote control device, and further includes both a public key 7 and a private key 8 for encryption and decryption purposes, respectively.

Figure 2:
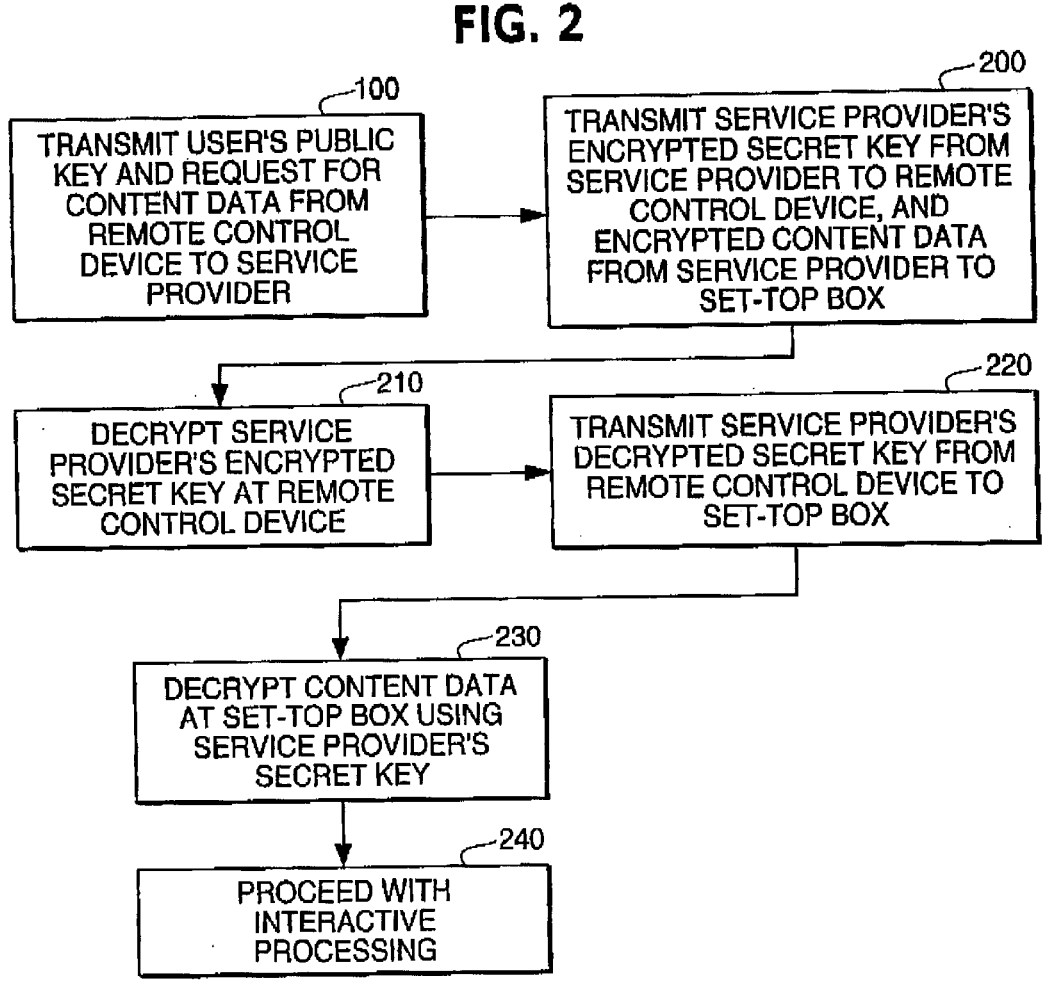
FIG. 2 shows a flowchart of the processing according to a first method embodiment of the present invention.

FIGS. 2 and 3, described below, represent two example method embodiments of the present invention for securely requesting and receiving subscriber content data utilizing the system of FIG. 1 described above, although the present invention is not limited only to such descriptions.

The method embodiments described in both FIGS. 2 and 3 start with step 100 whereby a user has activated a remote control device by reading the user's personalized smart card 5. The subsequent steps of the method embodiment of FIG. 2 will be described next. In step 200, the user enters a request for subscriber content data using a key-pad or a smart touch pad on the remote control device 1. The request for subscriber content data as well as the user's public key 7, which is stored on the user's smart card 5, are then both transmitted to the service provider 2 over a first transmission path 10 which is a two-way transmission path which includes, but is not limited to, a short message service (SMS). The first transmission path may be in accordance with diverse types of transmission mechanisms including, but not limited to, GSM, CDMA, UMTS, etc. SMS is a type of pager service within the Global System for Mobile Communications (GSM) mobile phone system that supports messages up to 160 characters in length. SMS supports binary formats, and messages ride on a separate signaling path so they are transmitted simultaneously with voice, data and fax. GSM is a digital cellular phone technology based on Time Division Multiple Access system (TDMA) that is widely deployed in Europe and throughout the world, operating in the 1.8 to 1.9 GHz band, compared to 800–900 MHz for other cellular systems. TDMA is a satellite and cellular phone technology that interleaves multiple digital signals onto a single high-speed channel.

The service provider 2 receives the user's transmitted public key, and, in step 200, encrypts a secret key 9 corresponding to the service provider and transmits the encrypted secret key 9 corresponding to the service provider back to the remote control device, via the same two-way connection 10 between the remote control device and the service provider on which the request for the subscriber content data was originally transmitted. Step 200 may also include the encryption of the requested subscriber content data by the service provider using the user's transmitted public key 7, and the further transmission of the encrypted requested content data to the set-top box 3 from the service provider 2.

Upon receiving the encrypted secret key 9 which has been encrypted using the user's public key from the service provider, in step 210 the remote control device decrypts the service provider's secret key 9 using the user's, private key 8 which is stored on the user's smart card 5. In step 220, the remote control device 1 then transmits the decrypted secret key 9 corresponding to the service provider to a set-top box 3 over a second transmission path 20 which is a two-way connection between the remote control device 1 and the set-top box 3. The two-way transmission path 20 between the remote control device 1 and the set-top box 3 includes, but is not limited to, encrypted transmission connections such as a bluetooth connection. The Bluetooth protocol is a radio frequency protocol having a radio frequency range such as 100 m to 1000 m.

Furthermore, the set-top box 3 is a multi-media terminal which receives, in steps 230, the encrypted requested subscriber content data from the service provider over a third transmission path 30. The third transmission path 30 is a one-way broadcasting path from the service provider to the set-top box including, but not limited to, a digital video broadcasting transmission (DVB-T). DVB is an international digital broadcast standard for TV, audio and data which can be broadcast via satellite, cable or terrestrial systems.

If the first transmission path 10 is not available for any reason, as an alternative when the remote controller is used, a fourth path (not illustrated), which performs the function of the first path, may be used which is comprised of the second path 20 and a telephone modem connection between the set top box 3 and the service provider 2. The set-top box 3 may include a wireless modem.

The encrypted requested content data is decrypted at the set-top box 3 after the set-top box 3 has received both the subscriber content data which has been encrypted by the service provider's secret key 9 over the third transmission path 30 (step 200) and the decrypted secret key 9 corresponding to the service provider from the remote control device 1 over the second transmission path 20 (step 220). Then in step 230 the encrypted requested subscriber content data is decrypted using the service provider's secret key 9 and is then ready for display and/or further interactive activity ordered by the user of the remote control device, as shown by step 240.

In a second method embodiment of the present invention, as shown in FIG. 3, after the step 100 request for subscriber content data and the user's public key 7 have been transmitted from the user's remote control device 1 to the service provider 2 over the first transmission path 10, in step 300 the service provider 2 transmits to the set-top box 3 the secret key 9 corresponding to the service provider 2 which is encrypted using the user's transmitted public key 7 and the requested subscriber content data which is encrypted using the secret key 9. The service provider 2 transmits the encrypted secret key 9 and the encrypted requested subscriber content data over one-way third transmission path 30, which is described above.

In step 310, the set-top box 3 then transmits the encrypted secret key 9 to the remote control device I over the second transmission path 20. Upon receiving the encrypted secret key 9, in step 320 the remote control device 1 decrypts the service provider's secret key 9 using the user's private key 8 which is stored on the users smart card 5. It should be noted that for all method embodiments, including but not limited to those shown in FIGS. 2 and 3, the smart card 5 may either remain inserted in the remote control device 1 or the smart card 5 may be read by the remote control device 1 with the personal information of the user, including the user's public key 7 and private key 8 being downloaded onto the microprocessor 6 of the remote control device 1.

In step 330, the remote control device 1 transmits the decrypted secret key 9 corresponding to the service provider 2 back to the set-top box 3 over the second transmission path 20, thus enabling step 340 whereby the encrypted subscriber content data to be decrypted at the set-top box 3 using the service provider's secret key 9. The decrypted subscriber content data is then ready for display and/or further interactive activity ordered by the user of the remote control device, as shown by step 350.

Thus, the present invention in a preferred embodiment utilizes cryptography keys stored in personalized smart cards in combination with cryptography keys corresponding to respective service providers, to enable a user to use a remote control device to securely request subscriber content data from a service provider and securely receive the requested subscriber content data from the service provider.

While the present invention has been described in detail and pictorially in the accompanying drawings, it is not limited to such details since many changes and modifications may be made thereto without departing from the spirit and scope of the present invention. For example, the transfer of keys over the second transmission path 20 could be eliminated if the content data is encrypted or decrypted on the smart card. It is intended that all such modifications fall within the scope of the following claims.

We claim:

1. A method for providing content data from a service provider to a requesting and user, said method comprising the steps of:

transmitting, through a first transmission path, from a remote control device corresponding to said end user to a service provider, a public key and a request for content data;

transmitting, through said first transmission path, a secret key encrypted by said public key from said service provider to said remote control device;

receiving said secret key encrypted by said public key from said service provider at said remote control device;

decrypting, at said remote control device, the secret key using a private key corresponding to said public key of said end user;

transmitting, through a second transmission path, from said remote control device to a set-top box, the decrypted secret key corresponding to said service provider, transmitting, through a third transmission path, from said service provider to said set-top box, the requested content data encrypted by said secret key; and decrypting the encrypted content data, by said set-top box, using the secret key corresponding to said service provider.

2. The method according to claim 1, wherein said first transmission path is a two-way data or messaging connection between said remote control device and said service provider.

3. The method according to claim 2, wherein said two-way TDMA connection is a two-way GSM (Global System for Mobile Communications) connection between said remote control device and said service provider.

4. The method according to claim 3, wherein said two-way GSM connection is a two-way SMS (Short Message Service) connection between said remote control device and said service provider.

5. The method according to claim 1, wherein said second transmission path is encrypted.

6. The method according to claim 5, wherein said second transmission path is a two-way bluetooth connection between said remote control device and said set-top box.

7. The method according to claim 1, wherein said third transmission path is a one-way transmission path from said service provider to said set-top box.

8. The method according to claim 7, wherein said one-way transmission path is a DVB (Digital Video Broadcasting) transmission path.

9. The method according to claim 1, wherein said remote control device is activated by a smart card, and said smart card stores said public key and said private key corresponding to said end user.

10. The method according to claim 1, wherein said set-top box is a multi-media terminal.

11. The method according to claim 10, wherein said multi-media terminal is an electronic notebook.

12. The method according to claim 10, wherein said multi-media terminal is a television set.

13. The method according to claim 1, wherein said remote control device is a hand-held pager.

14. The method according to claim 1, wherein said remote control device is a telephone.

15. A method in accordance with claim 1 wherein:
the first transmission path differs from the second transmission path with second transmission path terminating at the set top box.

16. A method for providing content data from a service provider to a requesting end user, said method comprising the steps of:
transmitting, through a first transmission path, from a remote control device to a service provider, a public key and a request for content data;
transmitting, through a third transmission path, from said service provider to a set-top box, a secret key corresponding to said service provider encrypted by said public key and the requested content data encrypted by said secret key;
transmitting, through a second transmission path, from said set-top box to said remote control device, the encrypted secret key corresponding to said service provider;
decrypting, by said remote control device, said secret key corresponding to said service provider using a private key corresponding to said public key of said end user;
transmitting, through said second transmission path, from said remote control device to said set-top box, the decrypted secret key corresponding to said service provider; and decrypting, by said set-top box, the encrypted content data using the secret key corresponding to said service provider.

17. The method according to claim 16, wherein said first transmission path is a two-way data or messaging connection between said remote control device and said service provider.

18. The method according to claim 17 wherein said two-way TDMA connection is a two-way GSM (Global System for Mobile Communications) connection between said remote control device and said service provider.

19. The method according to claim 18, wherein said two-way GSM connection is a two-way SMS (Short Message Service) connection between said remote control device and said service provider.

20. The method according to claim 16 wherein said second transmission path is encrypted.

21. The method according to claim 20, wherein said second transmission path is a two-way bluetooth connection between said remote control device and said set-top box.

22. The method according to claim 16, wherein said third transmission path is a one-way transmission path from said service provider to said set-top box.

23. The method according to claim 22, wherein said one-way transmission path is a DVB (Digital Video Broadcasting) transmission path.

24. The method according to claim 16, wherein said remote control device is activated by a smart card, and said smart card stores said public key and said private key corresponding to said end user.

25. The method according to claim 16, wherein said set-top box is a multi-media terminal.

26. The method according to claim 25, wherein said multi-media terminal is an electronic notebook.

27. The method according to claim 25, wherein said multi-media terminal is a television set.

28. The method according to claim 16, wherein said remote control device is a hand-held pager.

29. The method according to claim 16, wherein said remote control device is a telephone.

30. A method in accordance with claim 16 wherein:
the first transmission path differs from the second transmission path with second transmission path terminating at the set top box.

31. A subscriber data content service receiving system, comprising:
a remote control device corresponding to an end user;
a set-top box; and
a service provider; wherein:
said remote control device transmits to a service provider, through a first transmission path, a public key and a request for content data;
said service provider transmits to said remote control device, through said first transmission path, a secret key encrypted by said public, key;
said remote control device receives said secret key encrypted by said public key from said service provider;
said remote control device decrypts said secret key using a private key corresponding to said public key of said end user;
said remote control device transmits to said set-top box, through a second transmission path, the decrypted secret key corresponding to said service provider;
said service provider transmits to said set-top box, through a third transmission path, the requested content data encrypted by said secret key; and said set-top box decrypts the encrypted content data using the secret key corresponding to said service provider.

32. The system according to claim 31, wherein said first transmission path is a two-way TDMA connection between said remote control device and said service provider.

33. The system according to claim 32, wherein said TDMA connection is a two-way GSM (Global System for Mobile Communications) connection between said remote control device and said service provider.

34. The system according to claim 33, wherein said GSM connection is a two-way SMS (Short Message Service) connection between said remote control device and said service provider.

35. The system according to claim 31, wherein said second transmission path is encrypted.

36. The system according to claim 35, wherein said second transmission path is a two-way bluetooth connection between said remote; control device and said set-top box.

37. The system according to claim 31, wherein said third transmission path is a one-way transmission path from said service provider to said set-top box.

38. The system according to claim 37, wherein said one-way transmission path is a DVB (Digital Video Broadcasting) transmission path.

39. The system according to claim 29, wherein said remote control device is activated by a smart card, and said smart card stores said public key and said private key corresponding to said end user.

40. The system according to claim 31, wherein said set-top box is a multi-media terminal.

41. The system according to claim 40, wherein said multi-media terminal is an electronic notebook.

42. The system according to claim 40, wherein said multi-media terminal is a television set.

43. The system according to claim 31, wherein said remote control device is a hand-held pager.

44. The system according to claim 31, wherein said remote control device is a telephone.

45. A subscriber data content service receiving system in accordance with claim 31 wherein:
the first transmission path differs from the second transmission path with second transmission path terminating at the set top box.

46. A subscriber data content service receiving system, comprising:
a remote control device corresponding to an end user;
a set-top box; and
a service provider; wherein:
said remote control device transmits to a service provider, through a first transmission path, a public key and a request for content data;
said service provider transmits to a set-top box, through a third transmission path, a secret key corresponding to said service provider encrypted by said public key and the requested content data encrypted by said secret key;
said set-top box transmits to said remote control device, through a second transmission path, the encrypted secret key;
said remote control device decrypts said secret key corresponding to said service provider using a private key corresponding to said public key of said end user;
said remote control device transmits to said set-top box, through said second transmission path, the decrypted secret key corresponding to said service provider; and
said set-top box decrypts the encrypted content data using the secret key corresponding to said service provider.

47. The system according to claim 46, wherein said first transmission path is a two-way TDMA connection between said remote control device and said service provider.

48. The system according to claim 46, wherein said two-way TDMA connection is a two-way GSM (Global System for Mobile Communications) connection between said remote control device and said: service provider.

49. The system according to claim 48, wherein said two-way GSM connection is a two-way SMS (Short Message Service) connection between said remote control device and said service provider.

50. The system according to claim 46, wherein said second transmission path is encrypted.

51. The system according to claim 50, wherein said second transmission path is a two-way bluetooth connection between said remote control device and said set-top box.

52. The system according to claim 46, wherein said third transmission path is a one-way transmission path from said service provider to said set-top box.

53. The system according to claim 52, wherein said one-way transmission path is a DVB (Digital Video Broadcasting) transmission path.

54. The system according to claim 46, wherein said remote control device is activated by a smart card, and said smart card stores said public key and said private key corresponding to said end user.

55. The system according to claim 46, wherein said set-top box is a multi-media terminal.

56. The system according to claim 52, wherein said multi-media terminal is an electronic notebook.

57. The system according to claim 55 wherein said multi-media terminal is a television set.

58. The system according to claim 46, wherein said remote control device is a hand-held pager.

59. The system according to claim 46, wherein said remote control device is a telephone.

60. A subscriber data content service receiving system in accordance with claim 46 wherein:
the first transmission path differs from the second transmission path with second transmission path terminating at the set top box.

* * * * *